United States Patent [19]
Savoca et al.

[11] Patent Number: 5,194,609
[45] Date of Patent: Mar. 16, 1993

[54] 3-QUINUCLIDINOL CATALYST COMPOSITIONS FOR MAKING POLYURETHANE FOAMS

[75] Inventors: Ann C. L. Savoca, Sinking Spring; Mark L. Listemann, Whitehall, both of Pa.

[73] Assignee: Air Products and Chemicals, Inc., Allentown, Pa.

[21] Appl. No.: 918,185

[22] Filed: Jul. 21, 1992

Related U.S. Application Data

[62] Division of Ser. No. 828,433, Jan. 30, 1992, Pat. No. 5,143,944.

[51] Int. Cl.$^5$ ...................... C07D 251/34; C08G 18/18
[52] U.S. Cl. ......................................... 544/193; 528/54
[58] Field of Search ............................ 544/193; 528/54

[56] References Cited

U.S. PATENT DOCUMENTS

| | | | |
|---|---|---|---|
| 3,036,021 | 5/1962 | Leverkasen et al. | 260/2.5 |
| 4,186,040 | 1/1980 | Aron et al. | 149/19.4 |
| 4,536,490 | 8/1985 | Regelman | 544/193 |
| 4,540,781 | 9/1985 | Barsa | 544/193 |
| 4,590,223 | 5/1986 | Arai et al. | 521/118 |
| 4,957,944 | 9/1990 | Schiffauer et al. | 521/115 |
| 5,071,809 | 12/1991 | Casey et al. | 502/155 |
| 5,143,944 | 9/1992 | Savoca | 544/193 |

OTHER PUBLICATIONS

G. Oertel, ed. "Polyurethane Handbook," Hanser Publishers, Munich, 1985, pp. 82, 84.
H. J. Fabris, "Advances in Urethane Science and Technology," vol. 6, Technomic Publishing Co., Westport, Conn. 1978, pp. 173–179.

*Primary Examiner*—Morton Foelak
*Attorney, Agent, or Firm*—Michael Leach; James C. Simmons; William F. Marsh

[57] ABSTRACT

A method for preparing a polyurethane foam which comprises reacting an organic polyisocyanate and a polyol in the presence of a blowing agent, a cell stabilizer and a catalyst composition consisting essentially of at least one compound of the following formula:

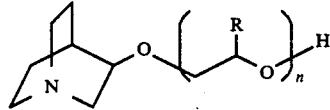

where R is hydrogen, $C_1$–$C_8$ alkyl, $C_6$–$C_{10}$ aryl or $C_7$–$C_{10}$ aralkyl, and n is 0–3. The preferred catalyst consists essentially of the compound when n is 0, namely 3-quinuclidinol.

1 Claim, No Drawings

3-QUINUCLIDINOL CATALYST COMPOSITIONS FOR MAKING POLYURETHANE FOAMS

This is a division of application Ser. No. 07/828,433 filed Jan. 30, 1992, now U.S. Pat. No. 5,143,944.

TECHNICAL FIELD

The present invention relates to tertiary amine catalysts for catalyzing the urethane reaction in making polyurethane foam.

BACKGROUND OF THE INVENTION

Polyurethane foams are widely known and used in automotive, housing and other industries. Foam is generally referred to as rigid, microcellular, or flexible. Typically, in the preparation of polyurethane foams, a tertiary amine catalyst is used to accelerate the reaction of the polyisocyanate with water to generate carbon dioxide as a blowing agent and to accelerate the reaction with polyols to promote gelling. Tertiary amines generally are malodorous and offensive, and many have high volatility due to low molecular weight. Release of tertiary amine during foam processing may present significant safety and toxicity problems, and release of residual amines from consumer products is generally undesirable.

Amine catalysts which contain primary and/or secondary hydroxyl functionality typically have limited volatility and low odor when compared to related structures which lack this functionality. Furthermore, catalysts which contain hydroxyl functionality chemically bond into the urethane during the reaction and are not released from the finished product. Catalyst structures which embody this concept are typically of low to moderate activity and are designed to promote primarily the blowing (water-isocyanate) reaction.

U.S. Pat. No. 4,957,944 discloses certain dimethylamino alkyleneoxy isopropanols for use as a catalyst for preparing polyurethane foam.

U.S. Pat. No. 5,071,809 discloses tertiary amine catalysts containing secondary alcohol functionality for use in preparing polyurethane foams. The tertiary amines containing secondary alcohol functionality are prepared by reacting an olefinic nitrile with an aliphatic polyol having at least one secondary hydroxyl functionality, followed by reductive alkylation of the resulting cyanoalkylated polyol with a secondary aliphatic or cycloaliphatic amine, including those containing hetero atoms.

U.S. Pat. No. 4,590,223 discloses the preparation of tertiary amines containing secondary alcohols by reacting N-alkylpiperazines with an alkyleneoxide.

Secondary alcohol functionality is preferred in these structures because the catalysts exhibit a desirable balance between their promotion of the water-isocyanate reaction and their own reactivity with isocyanates. In contrast, catalysts which contain primary alcohols react rapidly with isocyanates and thus high use levels are required. Catalysts which contain tertiary alcohols react slowly with isocyanates, but the urethanes which are formed from the tertiary alcohols have poor thermal stability. See G. Oertel, ed. "Polyurethane Handbook," Hanser Publishers, Munich, 1985, pp. 82, 84 and H. J. Fabris, "Advances in Urethane Science and Technology," Vol. 6, Technomic Publishing Co., Westport, CT, 1978, pp. 173-179. These urethanes may degrade and release the catalysts at temperatures substantially below the decomposition temperature of the foam itself. The free amine could then accelerate foam decomposition.

A catalyst which strongly promotes the polyol-isocyanate (gelling) reaction is necessary for the manufacture of many polyurethane foams. Triethylenediamine (1,4-diazabicyclo[2.2.2.]octane) is widely used for this purpose. Quinuclidine (1-azabicyclo[2.2.2.]octane) can also be used as a gelling catalyst, particularly when the polyol contains a preponderance of secondary hydroxyl groups (U.S. Pat. No. 3,036,021). Quinuclidine is more reactive than triethylenediamine for the production of polyurethane foams. Both triethylenediamine and quinuclidine are volatile materials which will not remain trapped in the foam.

U.S. Pat. No. 3,036,021 also discloses that 1-azabicyclooctanes and their alkyl, amino, hydroxyl, nitro, alkoxy and halogen derivatives can also be used as gelling catalysts, although no distinctions were made with regard to the effect of catalyst structure on activity or suitability for incorporation into a foam.

U.S. Pat. No. 4,186,040 discloses a solid, pyrotechnic composition for dissemination of 3-quinuclidinyl benzylete, the composition consisting essentially of 3-quinuclidinyl benzylete and an oxidizer incorporated in a solid foamed polyurethane binder. No information is provided on the utility of quinuclidinyl benzylete as a catalyst or as a TEDA replacement. Furthermore, quinuclidinyl benzylete does not remain trapped in the foam.

SUMMARY OF THE INVENTION

The present invention provides a catalyst composition for catalyzing the trimerization of an isocyanate and/or the reaction between an isocyanate and a compound containing a reactive hydrogen, e.g., the urethane reaction for making polyurethane. The catalyst composition is a family of hydroxyfunctional amines which comprises 3-quinuclidinol, alternatively 3-hydroxy-1-azabicyclo[2.2.2.]octane, as represented by the following formula I and the alkoxylated derivatives of 3-quinuclidinol as represented by the following formula II:

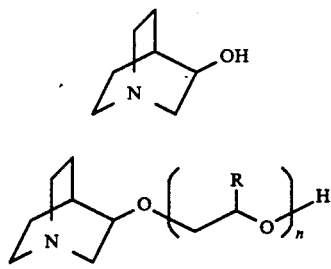

where R is hydrogen, a $C_1$–$C_8$ alkyl, $C_6$–$C_{10}$ aryl, or $C_7$–$C_{10}$ aralkyl group; and n is 1–3.

Compositions comprising mixtures of 3-quinuclidinol and compounds of formula II in which "n" is within the specific range are particularly preferred as catalysts, e.g., in such mixtures "n" would be 0-3, and most desirably "n" is 0 and 1.

As an advantage of the catalyst compositions, they strongly promote the polyol-isocyanate (gelling) reaction and are subsequently incorporated into the polyurethane product.

Another embodiment of the present invention is a polyurethane foam prepared by reacting a polyisocyanate, a polyol, water, cell stabilizer and a catalyst composition which comprises the hydroxyl functional amines of at least one of the above formulas I and II.

DETAILED DESCRIPTION OF THE INVENTION

The catalyst compositions according to the invention can catalyze the reaction between an isocyanate functionality and an active hydrogen-containing compound, i.e. an alcohol, an amine or water, especially the urethane (gelling) reaction to make polyurethanes and the blowing reaction of water with isocyanate to release carbon dioxide for making foamed polyurethanes, or the trimerization of the isocyanate functionality to form polyisocyanurates.

The polyurethane products are prepared using suitable organic polyisocyanates well known in the art including, for example, hexamethylene diisocyanate, phenylene diisocyanate, toluene diisocyanate ("TDI") and 4,4′-diphenylmethane diisocyanate ("MDI"). Especially suitable are the 2,4- and 2,6-TDIs individually or together as their commercially available mixtures. Other suitable isocyanates are mixtures of diisocyanates known commercially as "crude MDI", also known as PAPI, which contain about 60% of 4,4′-diphenylmethane diisocyanate along with other isomeric and analogous higher polyisocyanates. Also suitable are "prepolymers" of these polyisocyanates comprising a partially prereacted mixture of polyisocyanates and polyether or polyester polyols.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as reacting caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20-80% of the polyol portion of the masterbatch.

Other typical agents found in the polyurethane foam formulations include crosslinkers such as ethylene glycol, butanediol, diethanolamine, diisopropanolamine, triethanolamine and/or tripropanolamine; blowing agents such as water, methylene chloride, trichlorofluoromethane and the like; and cell stabilizers such as silicones.

A general polyurethane flexible foam formulation containing the catalyst composition according to the invention would comprise the following components in parts by weight (pbw):

| Flexible Foam Formulation | |
|---|---|
| | Parts by Weight |
| Polyol | 20–80 |
| Polymer Polyol | 80–20 |
| Silicone Surfactant | 1–2.5 |
| Blowing Agent | 2–4.5 |
| Crosslinker | 0.5–2 |
| Catalyst | 0.5–2 |
| Isocyanate Index | 92–115 |

The urethane catalyst composition consists essentially of 3-quinuclidinol or a 3-quinuclidinol derivative compound of the following general formula II, or a mixture thereof:

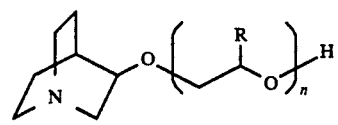

II where R is a hydrogen, $C_1$–$C_8$ alkyl, $C_6$–$C_{10}$ aryl or $C_7$–$C_{10}$ aralkyl group; and n is 1–3, preferably 1–2, and most preferably n is 1. For mixtures of compounds suitable as catalyst compositions (based on formula II), n is 0–3, preferably 0–2, and most preferably 0–1. For 3-quinuclidinol, n is 0 in formula II. Preferred mixtures which are liquid products would comprise 0 to 85 wt %, preferably 50 to 85 wt %, 3-quinuclidinol and 15 to 100 wt %, preferably 15 to 50 wt %, derivatives of formula II, provided that the derivative in which n is 3 and higher oligomers comprise no greater than 50 wt % of the mixture.

These mixtures can be prepared by simply blending the desired amounts of 3-quinuclidinol and appropriate derivatives or, in some cases by reacting 3-quinuclidinol with an appropriate amount of alkylene oxide.

Alkyl groups would include, for example, methyl, ethyl, butyl, ethylhexyl and the like; aryl groups would include, for example, phenyl, p-tolyl and the like, and aralkyl groups would include, for example, benzyl, phenethyl and the like. It is preferred that R be methyl.

The 3-quinuclidinol may be prepared by the procedure of U.S. Pat. No. 3,464,997. It is also commercially available, being marketed by Janssen Chemical and Aldrich Chemicals.

The alkoxylated derivatives of 3-quinuclidinol can be prepared by reacting 3-quinuclidinol with an alkylene oxide of the formula

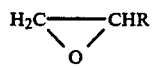

where R is hydrogen, $C_1$-$C_8$ alkyl, $C_6$-$C_{10}$ aryl or $C_7$-$C_{10}$ aralkyl, in the presence of a base catalyst in a dipolar aprotic solvent at temperatures ranging from RT up to the boiling point of the solvent and at pressures up to autogenous pressure. It is preferred that R be H or methyl, especially methyl. The alkylene oxide and the 3-quinuclidinol can be reacted in a 0.2:1 to 10:1 mole ratio range, preferably 1:1 to 3:1.

These derivatives of 3-quinuclidinol for the most part can be represented by formula II; however, lesser amounts of compounds involving

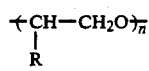

linkages could also be present in the reaction products.

A catalytically effective amount of the catalyst composition is used in the polyurethane formulation. More specifically, suitable amounts of the catalyst composition may range from about 0.01 to 10 parts per 100 parts by weight polyol in the polyurethane formulation.

The catalyst compositions may be used in combination with other tertiary amine and organotin urethane catalysts well known in the urethane art.

EXAMPLE 1

In this example a polyurethane foam was prepared in a conventional manner. The polyurethane formulation in parts by weight was:

| COMPONENT | PARTS |
| --- | --- |
| Multranol 9151 | 70 |
| Multranol 9143 | 30 |
| Water | 4.2 |
| Diethanolamine | 1.74 |
| DC 5164 | 1.0 |
| TDI 80 | 105 index |

Multranol 9151 polyol—polyurea filled, ethylene oxide tipped polyether polyol marketed by Mobay Corp.

Multranol 9143 polyol—ethylene oxide tipped, conventional polyether polyol marketed by Mobay Corp.

DABCO DC 5164 silicone surfactant marketed by Air Products and Chemicals, Inc.

TDI 80—a mixture of 80 wt % 2,4-TDI and 20 wt % 2,6-TDI.

The foam reactivity was measured using 33 wt % 3-quinuclidinal (3-QND) in ethylene glycol or DABCO 33LV ® catalyst (33 wt % triethylenediamine in dipropylene glycol) as gelling catalysts and DABCO ® BL-11 catalyst [70 wt % bis(dimethylaminoethyl)ether in dipropylene glycol] as the blowing catalyst. The activity of 3-QND was also compared to that of DABCO 33LV ® catalyst in the absence of a cocatalyst. Table 1 sets forth conditions and results.

TABLE 1

| Catalyst | DABCO 33LV/ DABCO BL-11 | 3-QND/ DABCO BL-11 | DABCO 33LV | 3-QND |
| --- | --- | --- | --- | --- |
| Amount (parts) | 0.42/0.15 | 0.42/0.15 | 1.26 | 1.26 |
| Top of Cup 1 (sec) | 11.3 | 10.5 | 11.6 | 10.6 |
| Top of Cup 2 (sec) | 47.6 | 40.5 | 40.0 | 43.3 |
| String Gel (sec) | 65.6 | 61.8 | 63.6 | 69.0 |
| Full Rise Time (sec) | 132.1 | 141.3 | 112.1 | 142.0 |

Times cited were from mixing of the polyol masterbatch with isocyanate. Top Cup 1 represents the time required for the foam formulation to fill a 16 oz cup and is an indication of reaction initiation. Top Cup 2 represents the time required for the foam formulation to fill a 1 gal cup in addition to the 16 oz cup mentioned above and is an indication of reaction progression. String Gel and Full Rise are further measures of reaction progression and provide some indication of extent of cure.

The advantage of 3-quinuclidinol is that it provides an excellent reactivity match for triethylenediamine during the critical early stages of the foaming reaction, and is then incorporated into the polymer, as seen in the increased full rise time measurement. Furthermore, the amount of 3-quinuclidinol can be increased to shorten the full rise time, but volatile emissions for the final product will not increase.

EXAMPLE 2

The example shows the propoxylation of 3-quinuclidinol.

To 25 g (197.1 mmol) of 3-quinuclidinol suspended in 30 mL of N,N-dimethylformamide (DMF) was added 0.0356 g (0.89 mmol) of sodium hydroxide catalyst. The mixture was heated to 65° C. with stirring. Propylene oxide (103.22 g, 592 mmols) was added dropwise while maintaining the temperature between 70° to 76° C. The 3-quinuclidinol conversion was 98.5%. The DMF was removed by vacuum distillation, and the residue fractionated by Kugelrohr distillation. Selected fractions were designated Propoxylate 1-3 and were tested as described in Example 3 and Table 2.

EXAMPLE 3

This example demonstrates the relative reactivity of the 3-quinuclidinol derivatives.

The rate of isocyanate consumption as a function of time was measured using a formulation similar to that of Example 1, but containing monofunctional reactants. Reaction samples drawn at the indicated times were quenched with dibutylamine and analyzed by liquid chromatography. The catalysts were compared on an equimolar basis corresponding to a loading of 0.35 parts per hundred parts of DABCO 33LV catalyst in the formulation in Example 1. Table 2 sets forth the results.

TABLE 2

| | % NCO Conversion | | | | | | | |
| --- | --- | --- | --- | --- | --- | --- | --- | --- |
| | Time (min) | | | | | | | |
| Catalyst | 0.5 | 1.0 | 1.5 | 2.0 | 3.0 | 4.0 | 5.0 | 6.0 |
| Triethylenediamine | 14.2 | 28.9 | 44.0 | 50.3 | 64.1 | 71.6 | 76.5 | 79.9 |
| 3-Quinuclidinol | 18.9 | 34.2 | 46.4 | 54.3 | 66.2 | 72.7 | 76.6 | 79.2 |
| Propoxy- | 16.2 | 29.6 | 41.6 | 50.4 | 64.3 | 71.4 | 76.2 | 79.3 |

TABLE 2-continued

| Catalyst | % NCO Conversion Time (min) | | | | | | | |
|---|---|---|---|---|---|---|---|---|
| | 0.5 | 1.0 | 1.5 | 2.0 | 3.0 | 4.0 | 5.0 | 6.0 |
| late 1[a] | | | | | | | | |
| Propoxylate 2[b] | 16.1 | 28.7 | 40.3 | 48.6 | 59.4 | 65.6 | 69.5 | 72.3 |
| Propoxylate 3[c] | 7.2 | 14.3 | 19.8 | 28.7 | 42.2 | 50.8 | 58.4 | 63.9 |
| Hydroquinine[d] | 7.9 | 17.8 | 25.5 | 32.1 | 41.9 | 49.7 | 54.6 | 59.9 |

[a]Propoxylate 1 contains 2.7% 3-quinuclidinol, 70.0% monopropoxylate (Formula II, n = 1) and 27.3% dipropoxylate (Formula II, n = 2) on a mole basis.
[b]Propoxylate 2 contains 17.1% monopropoxylate, 59.6% dipropoxylate, and 16.4% tripopoxylate on a mole basis.
[c]Propoxylate 3 contains 6.6% dipropoxylate, 79.9% tripropoxylate, and 9.2% tetrapropoxylate on a mole basis.

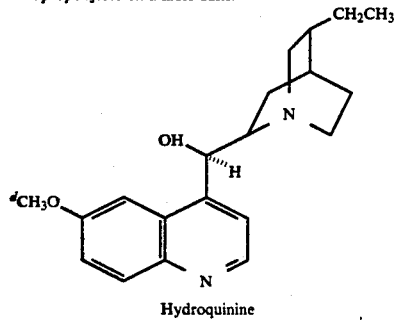

Hydroquinine

The uniqueness of the propoxylated 3-quinuclidinol derivatives is that they retain the desirable high activity of 3-quinuclidinol itself, as well as the necessary secondary alcohol functionality, but are liquids readily soluble in a variety of common catalyst carriers; e.g., dipropylene glycol. 3-Quinuclidinol, itself, is a high melting solid with limited solubility and thus is not convenient for all applications. Hydroquinine, although it also contains a secondary alcohol, is poorly active. Desirable activity is obtained if substitutes are placed on the 3-position, rather than the 2-position, of 1-azabicyclo[2.2.2.]octane. The size of the substituent on the 3-position may also influence the level of activity, as shown by the comparison of the results for propoxylate 3 to those for hydroquinine.

EXAMPLE 4

This example demonstrates the partial propoxylation of 3-quinuclidinol.

3-Quinuclidinol (39.4 mmols, 5.01 g), sodium hydroxide (0.2 mmol, 0.008 g), and DMF (10 mL) were charged to a 50 mL 3-neck roundbottom flask equipped with a magnetic stir bar, thermometer, reflux condenser and a septum. Propylene oxide (19.7 mmols, 1.14 g) was added by syringe over 5 minutes while stirring and heating the solution to 60° C. The temperature rose 5°–10° C. following the propylene oxide addition, and gradually dropped back to 60° C. over the next 15 minutes. The DMF was removed by heating the reaction to 40° C. at 500 mTorr for several hours. The product was a liquid.

The experiment was repeated as above with 39.7 mmols (5.05 g) of 3-quinuclidinol and 40.0 mmols (2.31 g) of propylene oxide, the other reagents and conditions remaining unchanged. The samples were analyzed by gas chromatography to determine the extent of propoxylation. The results are tabulated below.

| Run | 3-Quinuclidinol (mmols) | Propylene Oxide (mmols) | DMF | 3-Quinuclidinol | % Area by GC mono-PO | di-PO | tri-PO |
|---|---|---|---|---|---|---|---|
| 4A | 39.4 | 19.7 | 2 | 85 | 8 | 2 | 1 |
| 4B | 39.7 | 40.0 | 0.6 | 54 | 22 | 9 | 11 |

EXAMPLE 5

In this example a polyurethane foam was prepared in a conventional manner. The polyurethane formulation in weight parts was:

| Component | Parts |
|---|---|
| Pluracol-816 | 40 |
| Pluracol-973 | 60 |
| Water | 3.5 |
| Diethanolamine | 1.49 |
| DC 5043 | 1.5 |
| TDI 80 | 105 index |

Pluracol-816 polyol—ethylene Oxide tipped, conventional polyether polyol marketed by BASF AG.
Pluracol-973 polyol—styrene-acrylonitrile filled, ethylene oxide tipped polyether polyol marketed by BASF AG.
DABCO DC 5043 silicone surfactant marketed by Air products and Chemicals, Inc.

The foam reactivity was measured using DABCO 33LV catalyst, Run 4A catalyst (50 wt % in water) or Run 4B catalyst (50 wt % in water) as gelling catalysts and DABCO BL-11 catalyst as the blowing catalyst. Table 3 sets forth conditions and results.

TABLE 3

| Catalyst | DABCO 33LV/ DABCO BL-11 | Run 4A/ DABCO BL-11 | Run 4B/ DABCO BL-11 |
|---|---|---|---|
| Level (parts) | 0.50/0.15 | 0.41/0.15 | 0.54/0.15 |
| Top of Cup 1 (sec) | 10.2 | 10.7 | 11.3 |
| Top of Cup 2 (sec) | 32.3 | 35.2 | 34.9 |
| String Gel (sec) | 68.8 | 64.0 | 64.1 |
| Full rise time (sec) | 99.3 | 94.3 | 98.1 |

The results in Table 3 indicate that mixtures containing 3-quinuclidinol and propoxylated 3-quinuclidinol have activity comparable to that of triethylenediamine at equimolar use levels. Furthermore, the partially propoxylated mixtures are liquids which are more convenient to handle than 3-quinuclidinol itself.

The prior art high activity amine gelling catalysts are fugitive in that they can escape from a foam during or after its manufacture. The present invention successfully incorporates secondary alcohol functionality into high activity gelling catalysts which display activity similar to that of TEDA, the industry standard. The secondary alcohol functionality lowers the volatility of the catalysts of the invention and prevents their escape from the finished foam product through the chemical reaction with the foam itself. Moreover, the catalyst compositions are liquids which are easily processed and show negligible activity loss as compared to 3-quinuclidinol.

The prior art does not indicate that quinuclidine or its derivatives would be expected to have activity very similar to that of TEDA. An activity match is desirable so that the catalysts for the present invention can be easily employed as drop-in replacements for TEDA.

STATEMENT OF INDUSTRIAL APPLICATION

The present invention provides compositions for catalyzing the urethane reaction and preparing urethane products, especially polyurethane foam products.

We claim:
1. In a method for catalyzing the trimerization of an isocyanate and/or its reaction with an active hydrogen-containing compound, the improvement which comprises using as a catalyst 3-quinuclidinol.

* * * * *